No. 770,874. PATENTED SEPT. 27, 1904.
R. STANLEY.
MACHINE FOR MOLDING SINKS, LAVATORY BASINS, &c., IN EARTHENWARE
APPLICATION FILED MAY 8, 1903.
NO MODEL. 3 SHEETS—SHEET 1.

Witnesses:
Harry T. P. Gee.
A. L. Annison

Inventor
R. Stanley.
By Arthur N Stanley
Attorney.

No. 770,874. PATENTED SEPT. 27, 1904.
R. STANLEY.
MACHINE FOR MOLDING SINKS, LAVATORY BASINS, &c., IN EARTHENWARE.
APPLICATION FILED MAY 8, 1903.
NO MODEL. 3 SHEETS—SHEET 2.

Witnesses:
Harry T. P. Gee.
A. L. Anmson.

Inventor:
R. Stanley.
By Arthur H. Stanley
Attorney.

No. 770,874. PATENTED SEPT. 27, 1904.
R. STANLEY.
MACHINE FOR MOLDING SINKS, LAVATORY BASINS, &c., IN EARTHENWARE
APPLICATION FILED MAY 8, 1903.
NO MODEL. 3 SHEETS—SHEET 3.

Witnesses:
Harry T. P. Gee.
A. L. Annison.

Inventor:
R. Stanley.
By Arthur H. Stanley
Attorney.

No. 770,874.

Patented September 27, 1904.

UNITED STATES PATENT OFFICE.

REGINALD STANLEY, OF NUNEATON, ENGLAND.

MACHINE FOR MOLDING SINKS, LAVATORY-BASINS, &c., IN EARTHENWARE.

SPECIFICATION forming part of Letters Patent No. 770,874, dated September 27, 1904.

Application filed May 8, 1903. Serial No. 156,209. (No model.)

*To all whom it may concern:*

Be it known that I, REGINALD STANLEY, a subject of Edward, King of Great Britain and Ireland, residing at Manor Court, Nuneaton, in the county of Warwick, England, have invented certain new and useful Improvements in Machines for Molding Sinks, Lavatory-Basins, and Such Like Goods in Earthenware, of which the following is a specification.

This invention consists of improvements in machines for molding sinks, lavatory-basins, and such like goods in earthenware, the object of the invention being to increase the speed and improve the quality of manufacture of such goods.

The accompanying drawings illustrate my invention, wherein—

Figure 1:
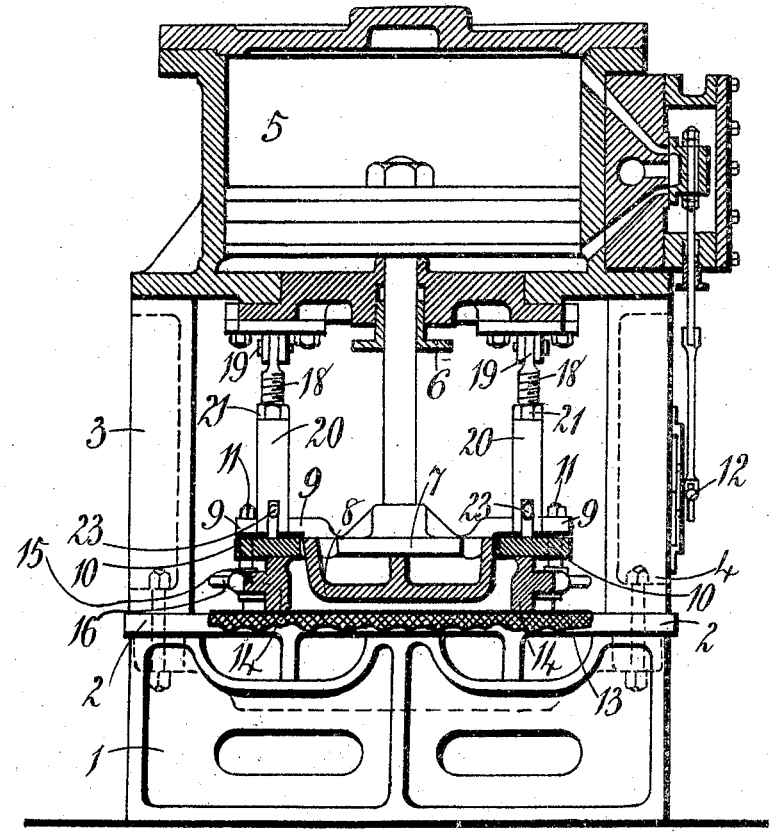
Figure 4:
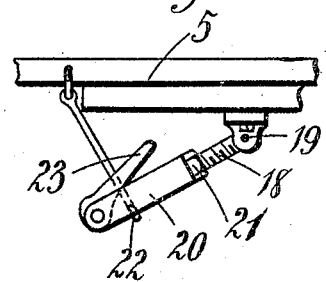
Figure 2:
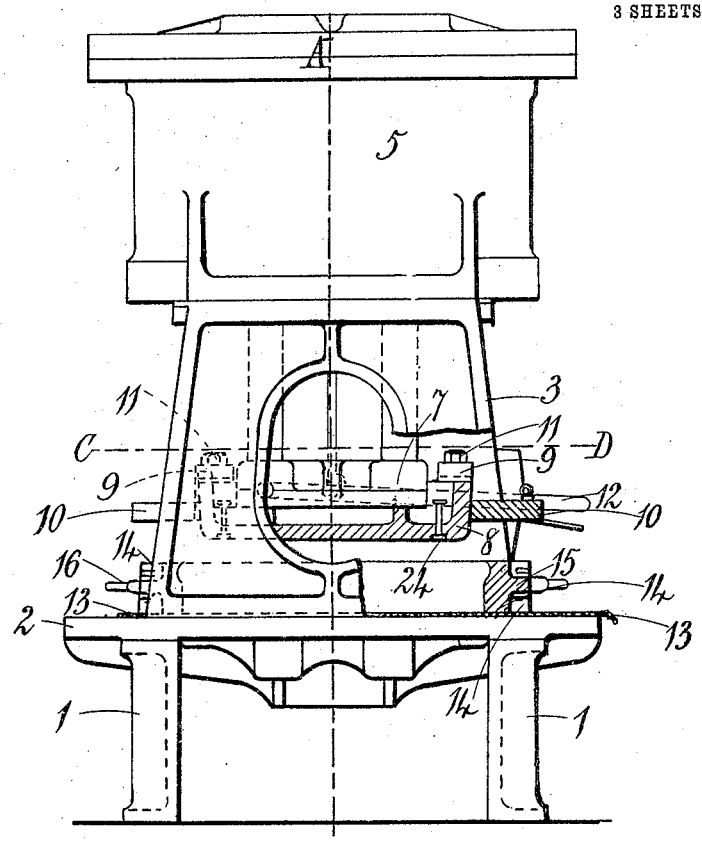
Figure 3:
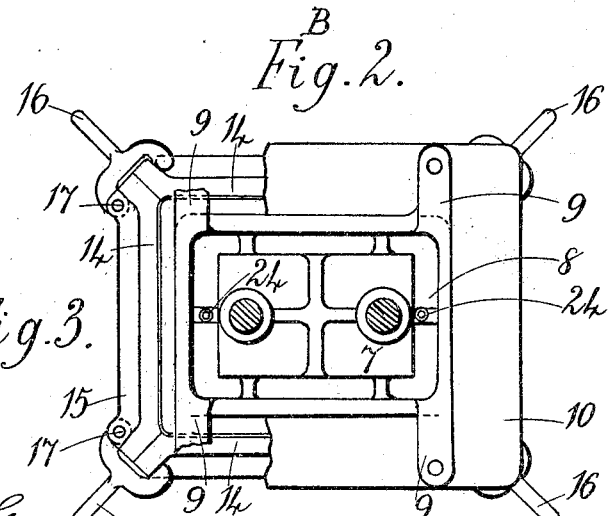
Figure 5:
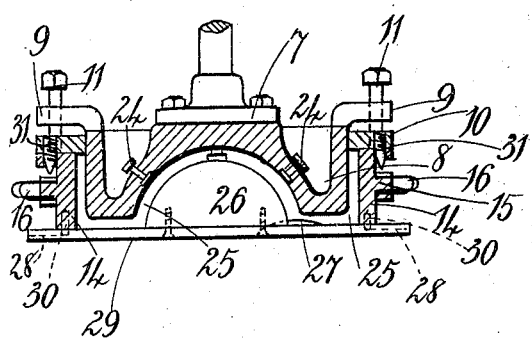
Figure 7:
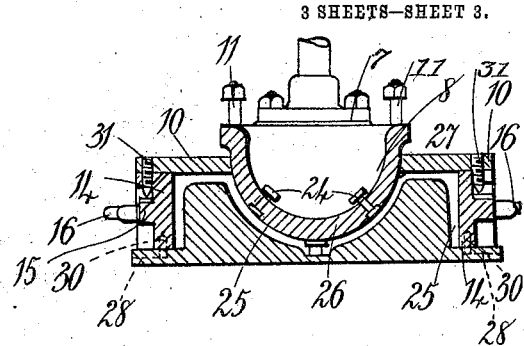
Figure 6:
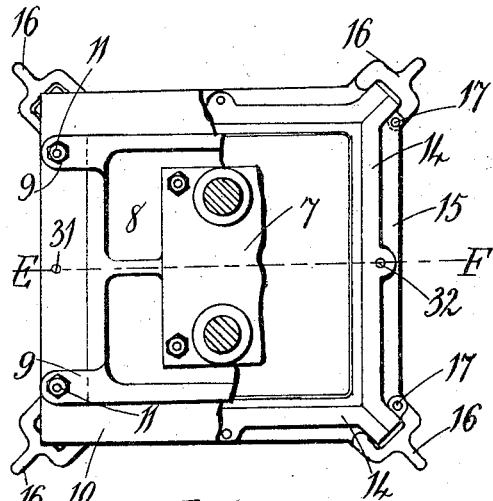
Figure 8:
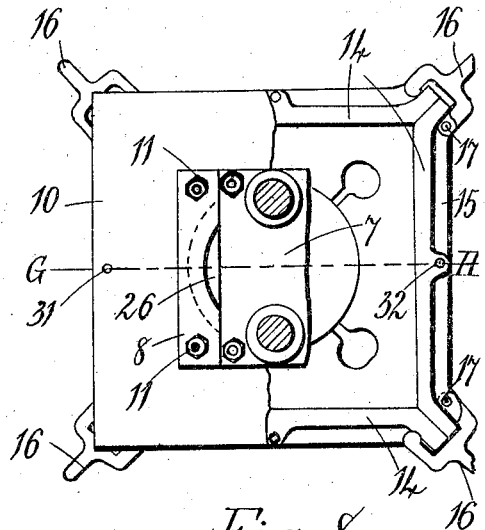

Figure 1 is a sectional elevation of the machine for molding sinks and is taken on line A B of Fig. 2. Fig. 2 is a side view, partly in section, of the machine. Fig. 3 is a sectional plan of the machine for molding sinks and is taken on line C D of Fig. 2. Fig. 4 is a side view of a detail of Fig. 1. Fig. 5 is a sectional elevation on line E F of Fig. 6 and shows a form of mold for producing lavatory-basins. Fig. 6 is a plan of Fig. 5. Fig. 7 is a sectional elevation on line G H of Fig. 8, showing another form of mold for producing lavatory-basins. Fig. 8 is a plan of Fig. 7.

In the drawings the base 1, table 2, and standards 3 and 4 constitute the framework of the machine.

5 is a steam-cylinder having the usual piston; but instead of a single piston-rod two piston-rods are preferably employed, because I find that sometimes the pressure within the mold is uneven when only one such rod is employed, causing the latter to jam or to unduly wear the gland 6, thereby seriously affecting the working of the machine, especially when making large sinks. Moreover, two piston-rods prevent any twisting or tilting of the upper die. The piston-rods carry a crosshead 7, to which is secured the upper die 8, having lugs 9 9. A plate 10 surrounds the upper die, being suspended loosely upon headed bolts 11 11, hanging from the lugs 9 9. The steam slide-valve for operating the upper die is actuated by a lever 12.

13 is a piece of canvas upon which stands the lower die, composed of sides 14 14, having strengthening-webs 15 15, the sides being secured together temporarily by means of clips 16 16, hinged to the sides 14 14 at 17 17.

The working of the machine (shown in Figs. 1 to 4) is as follows: Assuming the upper die to be raised, a clot of clay is placed within the lower die, when the upper die descends, and before its descent is finished the plate 10 rests upon the lower die, as in Fig. 2. At this stage, preferably, I use stays for keeping the plate 10 firmly pressed down to resist the upward pressure of the clay within the mold, as follows: Pins 18 18, Figs. 1 and 4, are hinged at 19 19 to the cylinder and sleeves 20 20 screwed over them, being held thereon at any desired position by means of lock-nuts 21 21. Each stay when not in use is held clear of the plate 10 by means of a hook 22. When the stay composed of the parts 18 and 19 is required for use, it is freed from the hook 22, so that it hangs vertically over the plate 10, when an eccentric handle 23 upon its end is swung round to firmly hold the plate down. 24 24 are air-valves within the upper die 8. The pressing of the sink is then completed, when the stays being released and the upper die raised the clips 16 16 are turned back, thus leaving the sides free to be removed, after which the sink is taken away on the canvas from the machine.

Modifications of lower and upper dies are shown in Figs. 5 to 8. According to Figs. 5 and 6, a lavatory-basin is molded face downward within the space 25, 26 and 27 being the dies for the dish of the basin and soap-receptacles, respectively. According to Figs. 7 and 8, the basin is molded the usual way up within the space 25. In both cases canvas, which may be elastic, may be used to prevent the article adhering to the mold. In these figures I have shown means for insuring that the several parts of the mold correctly register with one another, because such means are more necessary when thin articles, such as basins, are molded than with thick articles, such as sinks, although I may use similar means when molding thick articles. These means comprise grooves 28 28 within the board 29 and dowels 30 30 in the sides 14 14 and guide-studs 31 31, fixed in the plate 10 and adapted to enter holes 32 32 in the die sides. After the pressure the upper die is raised, the sides 14 14 removed, the cavity left by the upper die filled level with absorbent material, such as dry clay-dust or sawdust, in order to absorb the moisture and keep the basin in shape while drying. A flat board is then placed over the hole, which is then turned completely over and removed for drying previously to being glazed and burned in the kiln in the usual way. By employing suitable dies it is easy to make various shapes of basins in the above manner.

What I claim is—

1. In a machine for molding sinks, lavatory-basins, and such like goods, the combination with the upper die of a flat plate surrounding same, means for suspending the plate loosely to the die, stays pivotally held at one end and means within said stays for varying their length and also additional means at their other ends whereby the said plate may be firmly held down upon the tops of the sides of the lower die.

2. In a machine for molding sinks, lavatory-basins, and such like goods, the combination of an upper die, a flat plate surrounding same, means for suspending the plate loosely to the die, stays pivotally held at one end and means within said stays for varying their length, a lower die upon the table of the machine and composed of four sides which are separable from one another, means upon the stays whereby the said plate may be firmly held down upon the tops of the sides of the lower die, and clip 16 having one leg hinged to one of said sides, the other leg being adapted to grip the adjacent end of the next side for the purpose of fastening the two sides together when the clip is swung upon its pivot.

3. In a machine for molding sinks, lavatory-basins, and such like goods, the combination of an upper die, a flat plate surrounding same, means for suspending the plate loosely to the die, stays pivotally held at one end and means within said stays for varying their length, a lower die composed of four sides which are separable from one another, means upon the stays whereby the said plate may be firmly held down upon the tops of the sides of the lower die, clip 16 having one leg hinged to one of said sides the other leg being adapted to grip the adjacent end of the next side for the purpose of fastening the two sides together when the clip is swung upon its pivot, and dowels 30 upon the lower edges of said sides adapted to slide within grooves 28 whereby the sides may be brought into correct position for molding.

4. In a machine for molding sinks, lavatory-basins, and such like goods, the combination of an upper die, a flat plate surrounding same, studs 31 within said plate, means for suspending the plate loosely to the die, stays pivotally held at one end and means within said stays for varying their length, a lower die, means upon said stays whereby the said plate may be firmly held down upon the tops of the sides of the lower die, lugs having holes 32 upon the sides of the lower die and so situated that the studs 31 can enter said holes for the purpose of guiding the plate and the upper die into position upon the lower die.

In witness whereof I have hereunto set my hand in the presence of two witnesses.

REGINALD STANLEY.

Witnesses:
GEORGE BUTCHER,
A. H. YANNAWAY.